Figure 1:
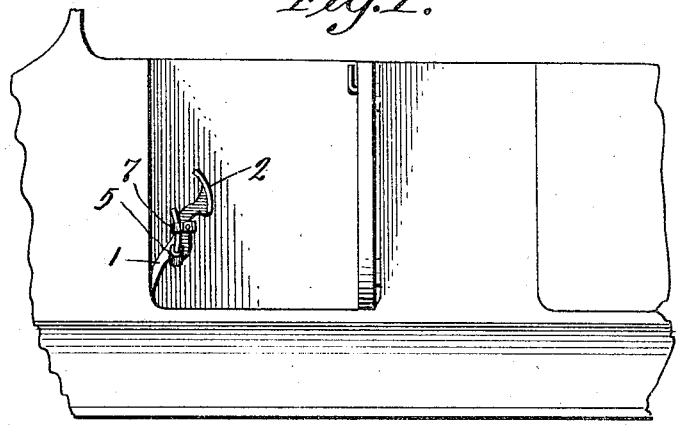

Feb. 5, 1924.

B. E. SLADE

PEDAL ATTACHMENT

Filed June 16, 1923

1,482,768

WITNESSES

Inventor
BUDD E. SLADE
Attorney

Patented Feb. 5, 1924.

1,482,768

UNITED STATES PATENT OFFICE.

BUDD E. SLADE, OF CHEYENNE WELLS, COLORADO.

PEDAL ATTACHMENT.

Application filed June 16, 1923. Serial No. 645,846.

*To all whom it may concern:*

Be it known that I, BUDD E. SLADE, a citizen of the United States, residing at Cheyenne Wells, in the county of Cheyenne and State of Colorado, have invented certain new and useful Improvements in Pedal Attachments, of which the following is a specification.

The principal object of the invention is to provide a simple, durable and inexpensive pedal attachment that may be easily and quickly installed, so that a person may conveniently actuate the control pedal to which the extension is attached, said extension being designed particularly for the reverse pedal of a Ford automobile so that when the same is pushed downwardly there will be no danger of the shoe engaging or being caught between the brake pedal and the low speed pedal as often happens especially where a person wears rather broad shoes or has over shoes on.

Another important object of the invention is to provide an extension of this nature which is extremely light so as not to over balance the pedal or treadle to which it is attached.

With the above and numerous other objects in view as will appear as the description progresses, the invention resides in certain novel features of construction, and in the combination and arrangement of parts that will be hereinafter more fully explained and claimed.

In the drawing:—

Figure 2:
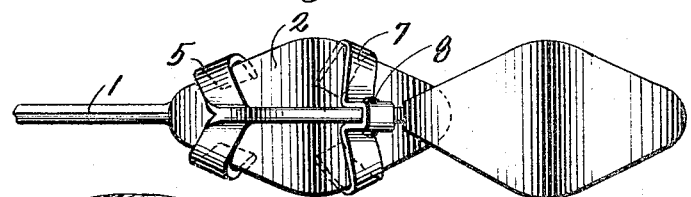
Figure 3:
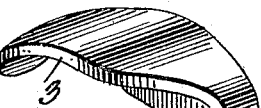
Figure 3:
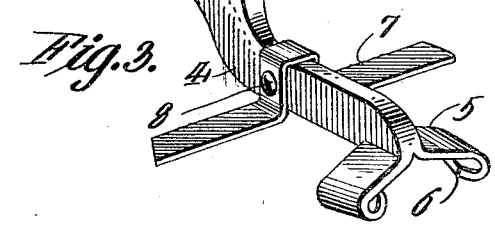

Figure 1 is a fragmentary side elevation of an automobile showing my extension attached to a pedal, Figure 2 is a plan view of the attachment, Figure 3 is a detail perspective view thereof.

Referring to the drawing in detail it will be seen that 1 designates a pedal of any preferred construction and by way of example I have here illustrated the reverse pedal of a Ford automobile which is provided with the usual foot plate 2. My extension includes a foot plate 3, formed on the end of a bar 4. At the other end of bar 4 there is provided a pair of rigid jaws 5, one of which extends from each side of the bar and terminates in an inwardly disposed hook extension 6, a bendable engaging member 7, is attached to the bar 4 intermediate its ends adjacent the foot plate 3 and consists of a piece of strap iron or the like riveted intermediate its ends to the bar as at 8 and terminating in arms which are bendable to form jaws as is shown in Figure 2. The rigid engaging member or jaws 5 are slipped over the bottom portion of the foot plate 2 and the bendable engaging member is then bent so as to form jaws which engage the upper portion of this foot plate 2.

It will be seen that with this extension on the reversing pedal of the Ford automobile the same is readily distinguished even when a blanket is covering the legs of the operator and furthermore it will be noticed there is no danger of a person's foot being caught between the other two control pedals.

I have, in the present instances, shown and described the preferred embodiment of my invention which will in practice give satisfaction and reliable results, and it is to be understood that the same is susceptible of modification in various particulars without the departing from the spirit or scope of the invention or sacrificing any of its advantages.

Having thus described my invention what I claim as new is:—

A pedal attachment of the class described including a bar, a pair of rigid jaws on the bar, and a bendable rod attached intermediate its ends to the bar and adapted to form jaws all in the manner and for the purpose specified.

In testimony whereof I affix my signature in presence of two witnesses.

BUDD E. SLADE.

Witnesses:
R. E. REYNOLDS,
C. R. FRYE.